(12) United States Patent
Park et al.

(10) Patent No.: US 11,491,850 B2
(45) Date of Patent: Nov. 8, 2022

(54) AIR CONDITIONER FOR VEHICLE

(71) Applicants: Hyundai Motor Company, Seoul (KR); Kia Motors Corporation, Seoul (KR); Hanon Systems, Daejeon (KR); Doowon Climate Control Co., Ltd., Chungcheongnam-do (KR)

(72) Inventors: Hae Ryong Park, Gyeonggi-do (KR); Yong Chul Kim, Gyeonggi-do (KR); Kyeong Hyeon Lee, Gyeonggi-do (KR); Hong Hee Jeong, Daejeon (KR); Yong Heung Lee, Daejeon (KR); Jung Hyun Kim, Daejeon (KR); Byung Guk An, Chungcheongnam-do (KR); Woo Man Hwang, Chungcheongnam-do (KR)

(73) Assignees: Hyundai Motor Company, Seoul (KR); Kia Motors Corporation, Seoul (KR); Hanon Systems, Daejeon (KR); Doowon Climate Control Co., Ltd., Chungcheongnam-do (KR)

( * ) Notice: Subject to any disclaimer, the term of this patent is extended or adjusted under 35 U.S.C. 154(b) by 550 days.

(21) Appl. No.: 16/675,521

(22) Filed: Nov. 6, 2019

(65) Prior Publication Data
US 2020/0331325 A1 Oct. 22, 2020

(30) Foreign Application Priority Data
Apr. 16, 2019 (KR) .................. 10-2019-0044248

(51) Int. Cl.
*B60H 3/00* (2006.01)
*F26B 3/04* (2006.01)
*B60H 1/00* (2006.01)
*B60H 1/02* (2006.01)
*B60H 3/02* (2006.01)

(52) U.S. Cl.
CPC ....... *B60H 3/0014* (2013.01); *B60H 1/00428* (2013.01); *B60H 1/00564* (2013.01); *B60H 1/00592* (2013.01); *B60H 1/00878* (2013.01); *B60H 1/02* (2013.01); *B60H 3/024* (2013.01); *F26B 3/04* (2013.01)

(58) Field of Classification Search
CPC ........ B60H 3/0014; B60H 3/024; B60H 3/04; B60H 2003/026; F26B 9/06; F26B 19/005; F26B 25/16; F26B 3/02; B01D 53/26; B60R 11/00
See application file for complete search history.

(56) References Cited

U.S. PATENT DOCUMENTS

2019/0030997 A1* 1/2019 Maeda ................ B60J 1/002

FOREIGN PATENT DOCUMENTS

| KR | 10-2012-0077098 | | 7/2012 | |
| KR | 20120077098 A | * | 7/2012 | ............ D06F 58/06 |
| KR | 10-1592318 | | 2/2016 | |
| KR | 101890890 B1 | | 8/2018 | |

* cited by examiner

*Primary Examiner* — Emmanuel E Duke
(74) *Attorney, Agent, or Firm* — Fox Rothschild LLP

(57) ABSTRACT

An air conditioner for a vehicle is provided and includes a dryer which is connected to an indoor air conditioner that adjusts the temperature and humidity within a vehicle. The air conditioner simultaneously dries a dry subject such as clothes, shoes or the like.

18 Claims, 16 Drawing Sheets

AIR CONDITIONER FOR VEHICLE

CROSS REFERENCE TO RELATED APPLICATION

The present application claims priority to Korean Patent Application No. 10-2019-0044248, filed on Apr. 16, 2019 the entire contents of which is incorporated herein for all purposes by this reference.

BACKGROUND

1. Technical Field

The present disclosure relates to a vehicle air conditioner, and more particularly, to an air conditioner that adjusts temperature and humidity within a vehicle and simultaneously, dries a dry subject such as clothes in a vehicle air conditioner field.

2. Description of the Related Art

Most vehicle air conditioners operate to properly maintain temperature and humidity in an indoor space of the vehicle. When air temperature is high as in the summer, a vehicle air conditioner allows outside or inside air of the vehicle to pass through a cooler core in which cooling water flows and discharges cooled and dehumidified air into the indoor space of the vehicle. When the air temperature is low as in the winter, the vehicle air conditioner allows the outside or inside air of the vehicle to pass through a heater core and discharges heated air into the indoor space of the vehicle. In addition, when the humidity in the vehicle is high and frost is formed on a window and the like of the vehicle, the vehicle air conditioner allows the outside or inside air of the vehicle to pass through the cooler core or the heater core to discharge dehumidified and heated air into the indoor space of the vehicle, thereby removing the frost formed on the window.

In a recent vehicle industry, a vehicle offers a variety of convenient functions beyond a simple driving function. Meanwhile, due to recent developments in a leisure industry and the like, more people move in the vehicle to enjoy leisure activities. Therefore, when getting in the vehicle with clothes, shoes or the like wet after a leisure activity, a passenger may feel uncomfortable. The same problem may also occur when the passenger enters in the vehicle with clothes, shoes or the like wet due to rain. Therefore, a new concept of a vehicle air conditioner is needed to solve the above problems.

The contents described as the related art are provided merely to assist in understanding the background of the present disclosure and should not be considered as corresponding to the related art known to those having ordinary skill in the art.

SUMMARY

An object of the present disclosure is to provide a vehicle air conditioner capable of adjusting temperature and humidity in an indoor space of a vehicle and simultaneously, drying a dry subject such as clothes in a vehicle air conditioner field.

According to an exemplary embodiment of the present disclosure, an air conditioner for a vehicle may include: an indoor air conditioner having an air inlet that allows air to flow into the indoor air conditioner, a cooler core, a heater core disposed at a point downstream of the cooler core, and an air outlet that discharges the air into an indoor space of a vehicle; a dryer having a drying space for storing a dry subject therein, an inlet port connected to a point downstream of the heater core of the indoor air conditioner to allow air passed through the heater core to flow into the drying space, and an outlet port connected to the drying space to discharge air passed through the drying space to outside; and a dryer door disposed between the indoor air conditioner and the inlet port of the dryer and adjusting the flow of the air passed through the heater core into the dryer.

A cross-sectional area of the inlet port of the dryer into which the air flows may be wider than a cross-sectional area of the outlet port of the dryer. The air conditioner may further include a select door disposed between the cooler core and the heater core of the indoor air conditioner and that adjusts a flow path of the air passed through the cooler core into the heater core. The air outlet of the indoor air conditioner may include a vent outlet and a floor outlet; and the air conditioner may further include a first outlet door that adjusts the air flowing into the air outlet to pass through at least one of the vent outlet and the floor outlet.

The air conditioner may further include a controller configured to operate the dryer door, the select door and the first outlet door to adjust the temperature and humidity of the indoor space of the vehicle and the dryer. In a first mode in which air does not flow into the indoor space of the vehicle and dehumidified and heated air flows into the dryer, the controller may be configured to operate the select door not to allow the air to flow into the air outlet of the indoor air conditioner and the dryer door to allow the air to flow into the inlet port of the dryer.

In a second mode in which cooled air flows into the indoor space of the vehicle and dehumidified and heated air flows into the dryer, the controller may be configured to operate the select door to allow the air to flow into the air outlet of the indoor air conditioner and the heater core and the dryer door to allow the air to flow into the inlet port of the dryer. In a third mode in which the dehumidified and heated air flows into the indoor space of the vehicle and the dryer, the controller may be configured to operate the select door not to allow the air to flow into the air outlet of the indoor air conditioner and the dryer door to allow the air to flow into the inlet port of the dryer and the air outlet of the indoor air conditioner. In a fourth mode in which the air does not flow into the dryer, the controller may be configured to operate the dryer door not to allow the air to flow into the inlet port of the dryer.

The select door may include a first select door and a second select door, the first select door that adjusts whether the air passed through the cooler core flows directly flow into the air outlet and the second select door that adjusts whether the air passed through the cooler core flows into the heater core together with the first select door. The air conditioner may further include a second outlet door disposed at any one of the vent outlet and the floor outlet of the air outlet. The second outlet door adjusts the air flowing into the air outlet to pass through both, one, or none of the vent outlet and the floor outlet.

The air conditioner may further include a controller configured to operate the dryer door, the first select door, the second select door, the first outlet door, and the second outlet door to adjust the temperature and humidity of the indoor space of the vehicle and the dryer. In the first mode in which air does not flow into the indoor space of the vehicle and dehumidified and heated air flows into the dryer, the controller may be configured to operate the dryer door to allow the air to flow into the inlet port of the dryer and the first and second outlet doors not to allow the air to flow into the vent outlet and the floor outlet.

In the second mode in which cooled air flows into the indoor space of the vehicle and dehumidified and heated air flows into the dryer, the controller may be configured to operate the first select door and the second select door to allow the air to flow into the air outlet of the indoor air conditioner and the heater core and the dryer door to allow the air to flow into the inlet port of the dryer. In the third mode in which the dehumidified and heated air flows into the indoor space of the vehicle and the dryer, the controller may be configured to operate the first select door not to allow the air to flow into the air outlet of the indoor air conditioner and the dryer door to allow the air to flow into the inlet port of the dryer. In the fourth mode in which the air does not flow into the dryer, the controller may be configured to operate the dryer door not to allow the air to flow into the inlet port of the dryer.

The air conditioner may further include a deodorizer disposed at one side of the dryer, wherein the air passed through the deodorizer deodorizes the dry subject. The air conditioner may further include a distribution panel formed in a panel shape on the drying space of the dryer and having a plurality of air flow apertures therein to allow the air flowed into the dryer to flow into the drying space. The air conditioner may further include a distribution duct formed in a duct shape in an upper portion of the drying space of the dryer and having a first side connected to the inlet port of the dryer and a second side formed with a distribution hole disposed diagonally to the outlet port of the dryer.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
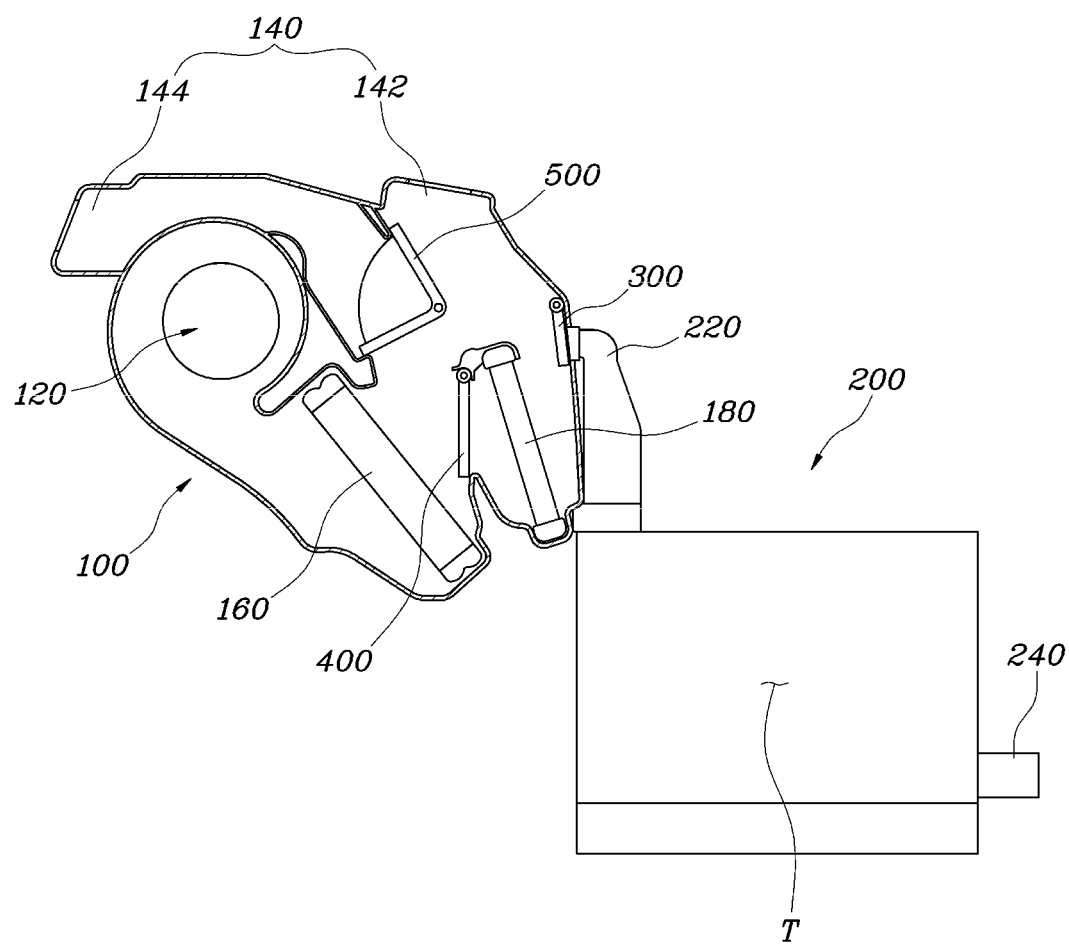
FIG. 1 is a view illustrating an air conditioner for a vehicle according to an exemplary embodiment of the present disclosure.
Figure 2:
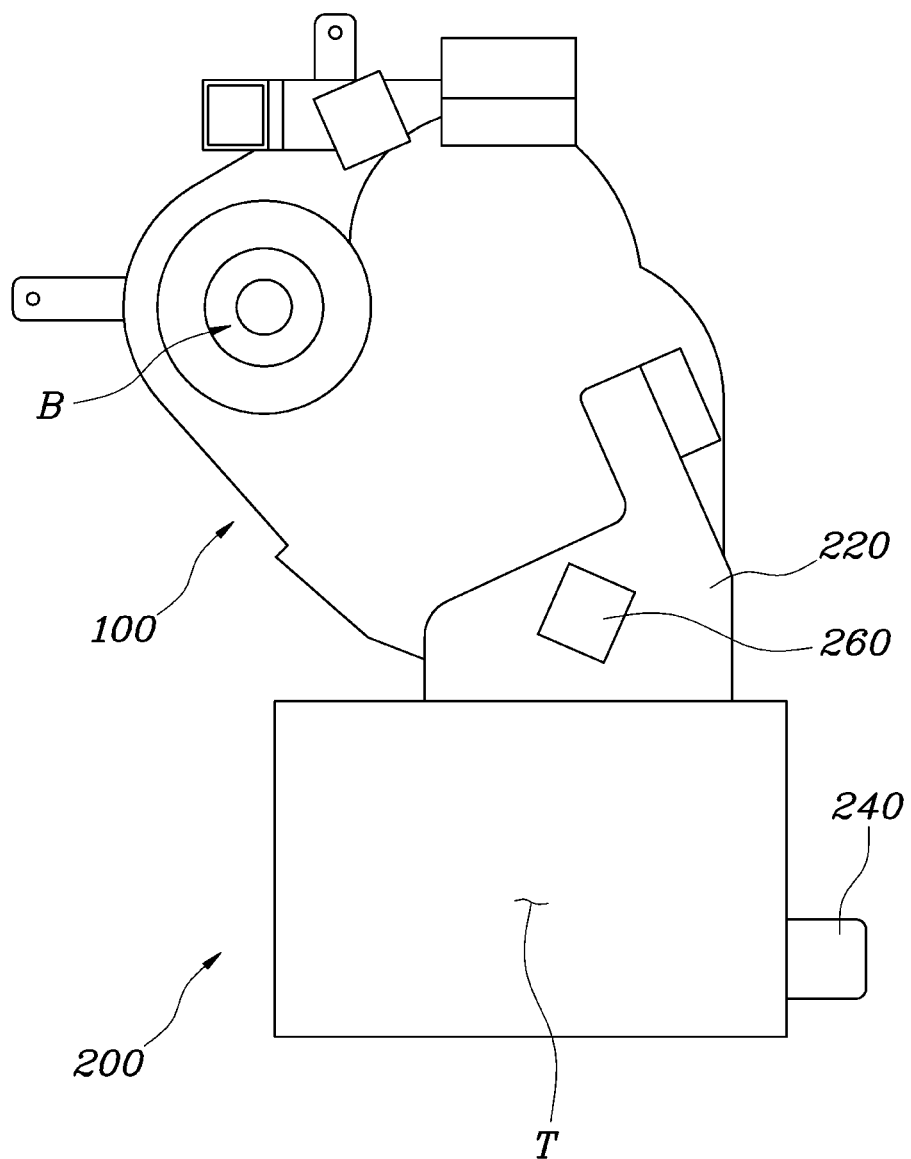
FIG. 2 is a perspective view illustrating an air conditioner for a vehicle according to an exemplary embodiment of the present disclosure.
Figure 3:
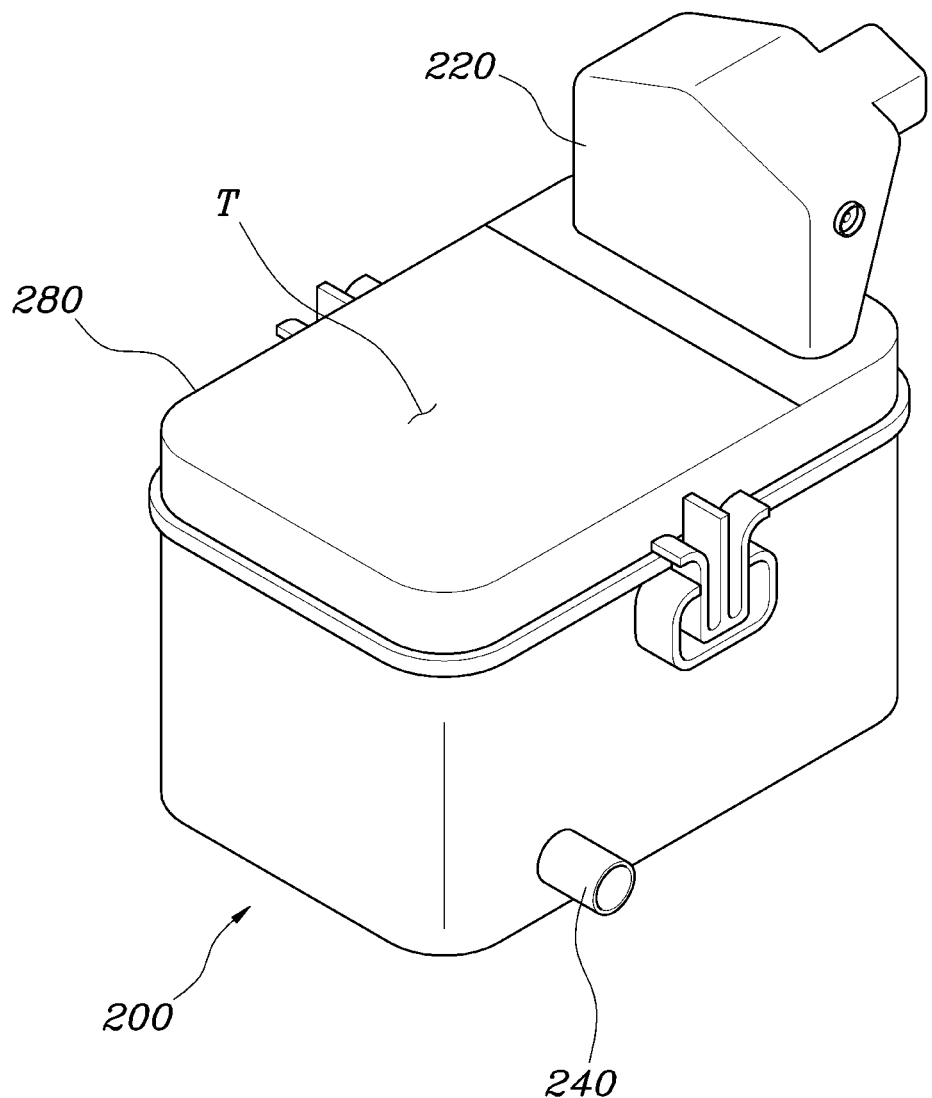
FIG. 3 is a view illustrating a dryer of an air conditioner for a vehicle according to an exemplary embodiment of the present disclosure.
Figure 14:
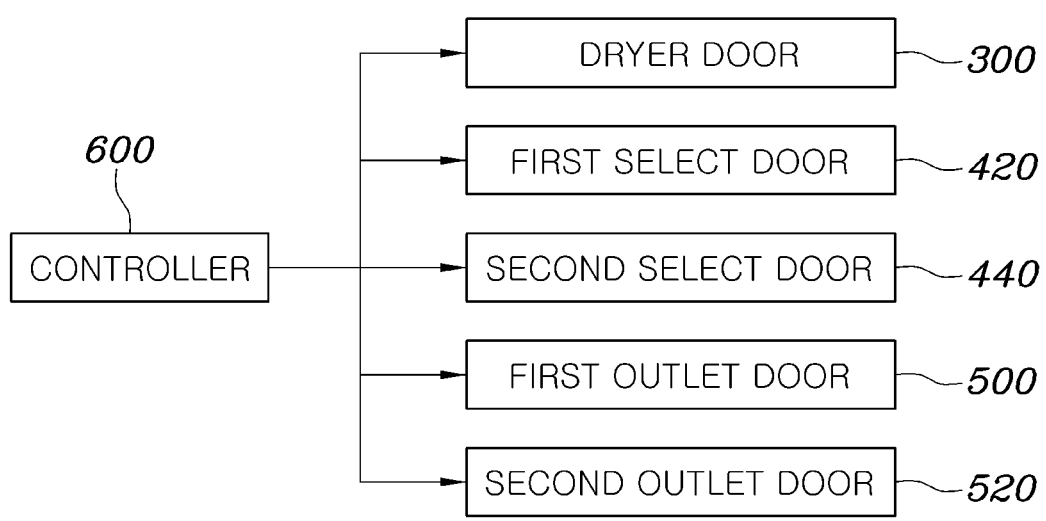
FIG. 14 is a view illustrating a controller of an air conditioner for a vehicle according to another exemplary embodiment of the present disclosure.
Figure 15:
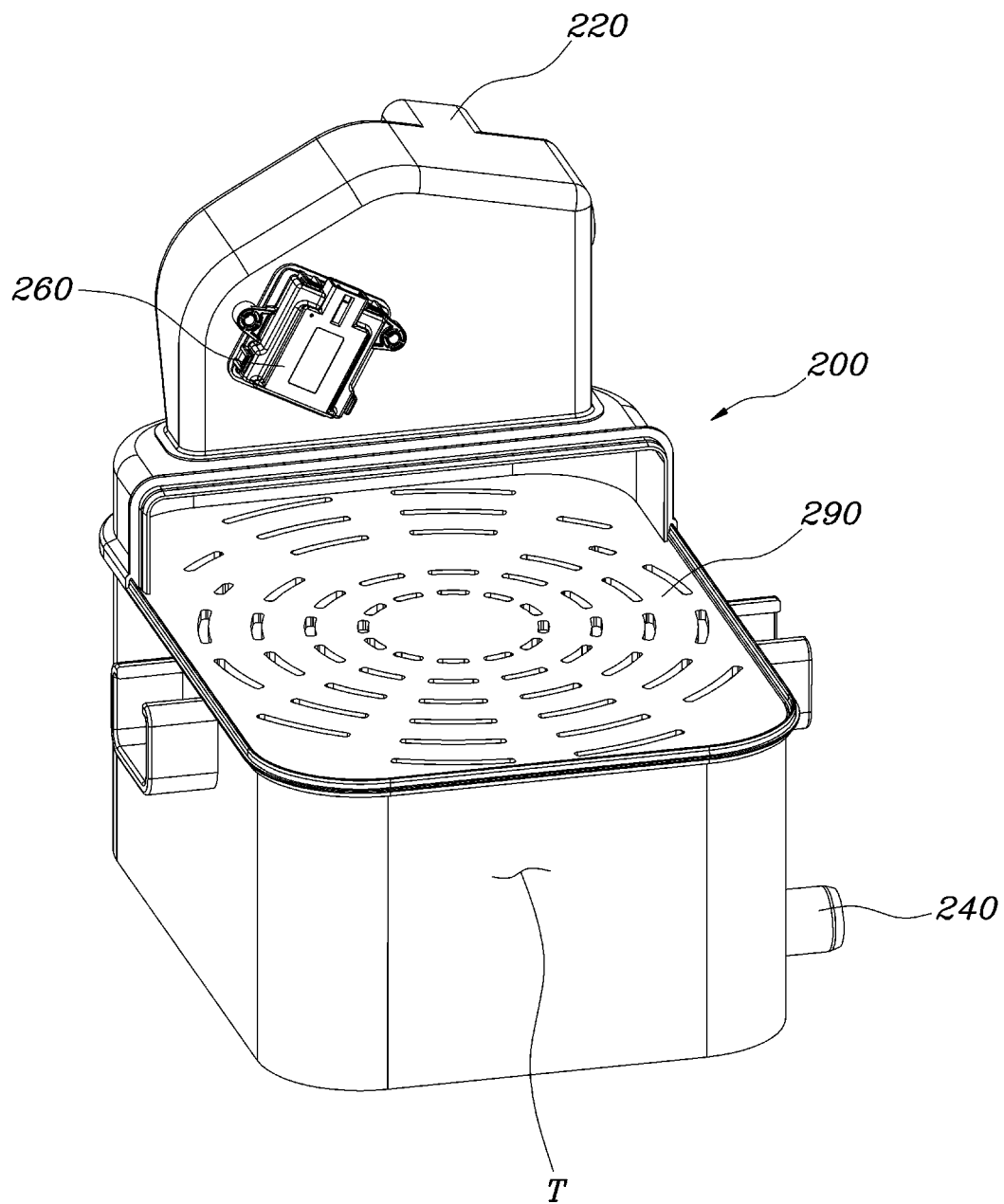
FIGS. 15 and 16 are views illustrating an inside of a dryer of an air conditioner for a vehicle according to an exemplary embodiment of the present disclosure.
Figure 16:
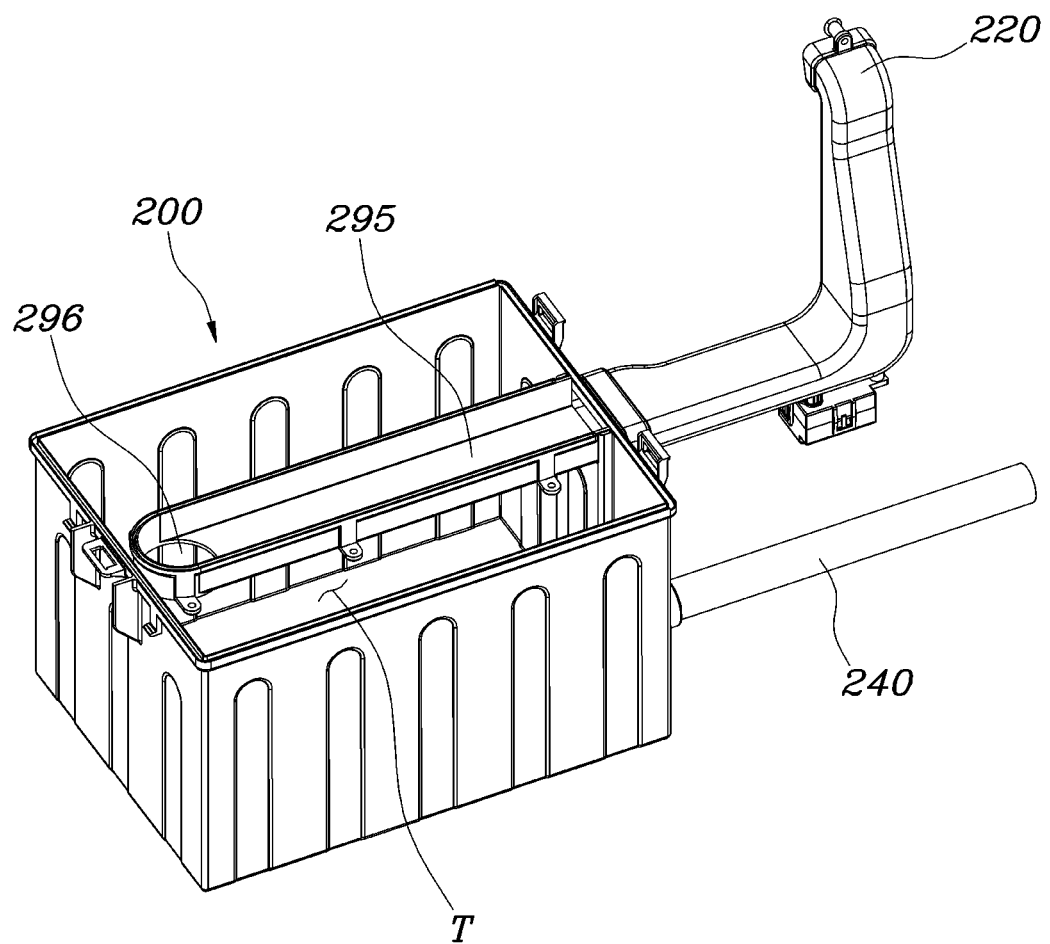

FIG. 1 is a view illustrating the air conditioner for a vehicle according to an exemplary embodiment of the present disclosure; FIG. 2 is a perspective view illustrating the air conditioner for a vehicle according to an exemplary embodiment of the present disclosure; FIG. 3 is a view illustrating a dryer of the air conditioner for a vehicle according to an exemplary embodiment of the present disclosure; FIGS. 4 to 8 are views illustrating each mode of the air conditioner for a vehicle according to an exemplary embodiment of the present disclosure; FIGS. 9 to 13 are views illustrating each mode of the air conditioner for a vehicle according to another exemplary embodiment of the present disclosure; FIG. 14 is a view illustrating a controller of the air conditioner for a vehicle according to another exemplary embodiment of the present disclosure; and FIGS. 15 and 16 are views illustrating an inside of a dryer of the air conditioner for a vehicle according to an exemplary embodiment of the present disclosure.

FIG. 1 is a cross-sectional view illustrating an indoor air conditioner and a dryer of the air conditioner for a vehicle according to an exemplary embodiment of the present disclosure. As illustrated in FIG. 1, the air conditioner for a vehicle according to the present disclosure may include: an indoor air conditioner 100 having an air inlet 120 that allows air to flow into the indoor air conditioner 100, a cooler core 160, a heater core 180 disposed at a point downstream of the cooler core 160, and an air outlet 140 through which the air may be discharged into an indoor space of a vehicle; a dryer 200 having a drying space T to store a dry subject therein, an inlet port 220 connected to a point downstream of the heater core 180 of the indoor air conditioner 100 to allow air passed through the heater core 180 to flow into the drying space T, and an outlet port 240 connected to the drying space T to discharge air passed through the drying space T to outside; and a dryer door 300 disposed between the indoor air conditioner 100 and the inlet port 220 of the dryer 200 and configured to control whether the air passed through the heater core 180 flows into the dryer 200.

As illustrated in FIG. 1, the indoor air conditioner 100 is provided in the present disclosure. The indoor air conditioner 100 may include the cooler core 160 and the heater core 180 disposed at the point downstream of the cooler core 160. Outside or inside air of the vehicle that has flowed into the air inlet 120 may pass through the cooler core 160 or both the cooler core 160 and the heater core 180. As illustrated in FIG. 2, a blower fan B may be disposed at one side of the indoor air conditioner 100 to allow the air to flow into the indoor air conditioner through the air inlet. Although not illustrated in FIG. 1, the blower fan B may be disposed at a point where the air inlet 120 is formed, to allow the outside or inside air of the vehicle to flow into the air inlet 120 when the blower fan B is rotated.

Additionally, cooling water or the like may flow in the cooler core 160 and thus air passing through the cooler core 160 may be cooled by heat exchange with the cooler core 160; and water vapor in the air may be condensed in the cooler core 160 to form a water droplet, and thus, the air passed through the cooler core 160 has reduced humidity. The air cooled and dehumidified in this manner may be supplied to the indoor space of the vehicle through the air outlet 140. Therefore, even in the summer during warmer temperatures, a passenger may continuously feel a comfortable temperature in the vehicle.

Meanwhile, the air passing through the heater core 180 disposed at the point downstream of the cooler core 160 may be heated by heat exchange with the heater core 180. The air heated in this manner may be supplied to the indoor space of the vehicle through the air outlet 140. Therefore, even in the winter during colder temperatures, a passenger may continuously feel a comfortable temperature in the vehicle. In addition, the dehumidified air passed through the cooler core 160 may be heated again when passing through the heater core 180. In particular, high-temperature and low-humidity air may be supplied to the indoor space of the vehicle through the air outlet 140. Such high-temperature and low-humidity air may remove frost formed on a window or the like of the vehicle during rain, and the passenger may thus secure visibility.

In addition, as illustrated in FIGS. 1 to 3, the air conditioner of the present disclosure may include the dryer 200 having the drying space T in which the dry subject may be stored. The inlet port 220 of the dryer 200 may be connected to the point downstream of the heater core 180 of the indoor air conditioner 100 to allow heated air passed through the heater core 180 to flow into the drying space T. The drying space T may store or accommodate the dry subject such as clothes, shoes or the like. Therefore, the dry subject may be dried when the passenger enters and drives the vehicle. Accordingly, even when clothes or shoes are wet due to the rain or leisure activities, it may be possible to dry these dry subjects or objects (e.g., subject, article, object or the like to be dried), and therefore the passenger may feel more comfortable. Air used for drying the dry subject may then be discharged to the outside through the outlet port 240 of the dryer 200.

FIG. 3 is a view illustrating a dryer 200 of the air conditioner according to an exemplary embodiment of the present disclosure. The dryer 200 illustrated in FIG. 3 may include the drying space T therein, and a lid 280 may be disposed on the drying space T. When the lid 280 is opened, an inlet for a dry subject is formed and when the lid 280 is closed, the dryer 200 may be sealed.

In addition, the dryer 200 of the air conditioner may include an outer case and an inner case. The inner case may be disposed in the outer case, and have the drying space T therein. Meanwhile, the inner case may be assembled to the outer case by a separate fixing structure (e.g., a hook and the like). Therefore, noise due to shaking or vibration of the inner case may be prevented. A foreign material holder with a mesh structure or the like may be provided at a bottom of the inner case and may have a structure onto which a foreign material adhering to an exterior of the dry subject may drop. A pad may be disposed between the inlet port 220 of the dryer 200 and the indoor air conditioner 100 at a point where the inlet port 220 of the dryer 200 is connected to the indoor air conditioner 100 to prevent any air leaks between the inlet port 220 of the dryer 200 and the indoor air conditioner 100.

Figure 4:
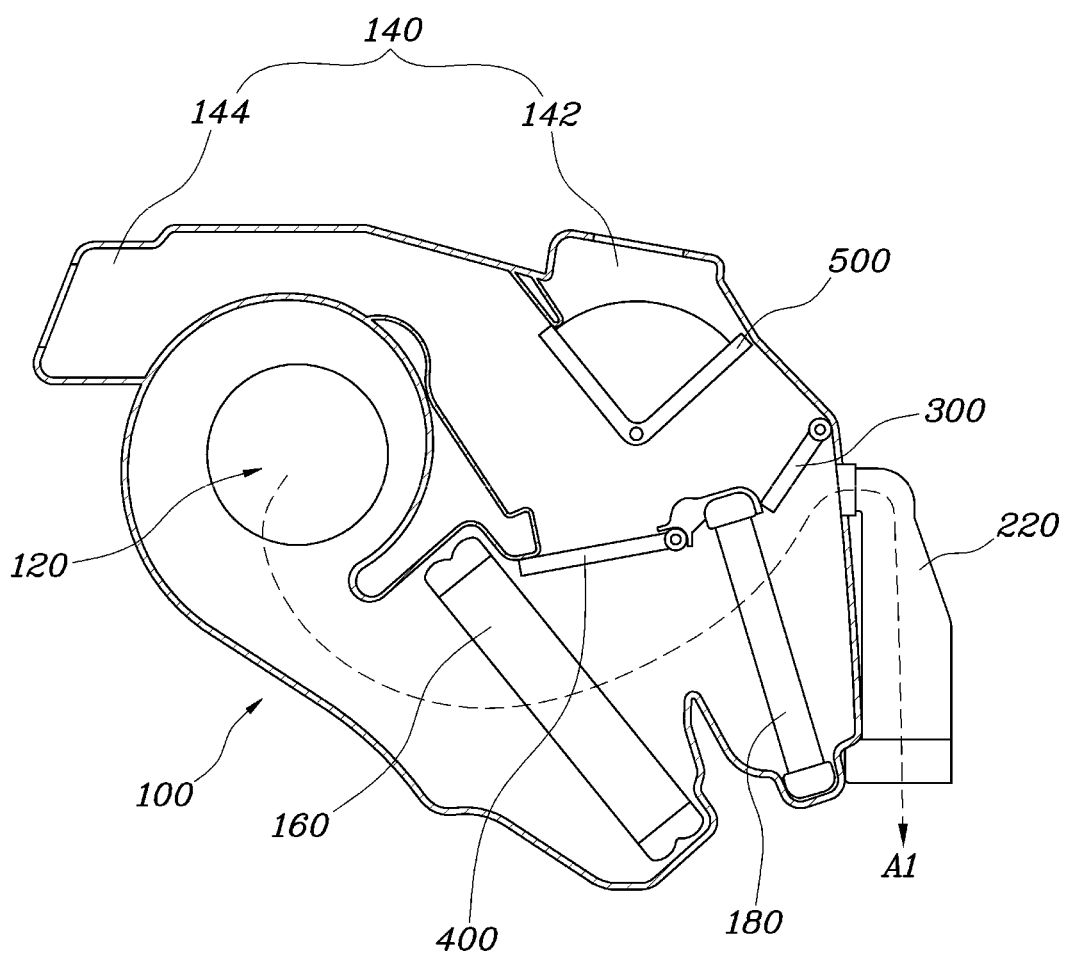
FIGS. 4 to 8 are views illustrating each mode of an air conditioner for a vehicle according to an exemplary embodiment of the present disclosure.

Meanwhile, as illustrated in FIG. 1, the dryer door 300 according to the present disclosure may control the air flowing from the indoor air conditioner 100 to the dryer 200. The dryer door 300 may be disposed between the indoor air conditioner 100 and the inlet port 220 of the dryer 200 to adjust whether the air passed through the heater core 180 flows into the dryer 200. FIG. 1 illustrates the air conditioner in a state in which the dryer door 300 closes the inlet port 220 of the dryer 200; and FIG. 4 illustrates the air conditioner in a state in which the dryer door 300 opens the inlet port 220 of the dryer 200. The dryer door 300 may open or close the inlet port 220 to allow the air to flow or to block the air from flowing from the indoor air conditioner to the dryer 200.

In particular, as illustrated in FIGS. 2 and 3, in the present disclosure, a cross-sectional area of the inlet port 220 of the dryer 200 into which the air flows may be wider or greater than a cross-sectional area of the outlet port 240 of the dryer 200. Accordingly, the cross-sectional area of the inlet port 220 of the dryer 200 may be greater than the cross-sectional area of the outlet port 240 of the dryer 200, and thus an amount of the air flowed into the inlet port 220 is greater than an amount of the air discharged from the outlet port 240. Accordingly, high-pressure air may be maintained in the drying space T of the dryer 200. As a result, high-temperature and high-pressure air improves a dry amount of the dry subject in the king space T.

In addition, as illustrated in FIG. 1, the present disclosure may further include a select door 400 disposed between the cooler core 160 and the heater core 180 of the indoor air conditioner 100 and that adjusts whether the air passed through the cooler core 160 flows into or is blocked from flowing into the heater core 180. The select door 400 may be configured to open or close an air flow path to control whether the air passed through the cooler core 160 flows into the heater core 180. FIG. 1 is a view illustrating a state in which the select door 400 closes the air flow path toward the heater core 180 to block the air passed through the cooler core 160 from flowing into the heater core 180, and FIG. 4 is a view illustrating a state in which the select door 400 opens the air flow path toward the heater core 180 to allow the air passed through the cooler core 160 to flow into the heater core 180.

Accordingly, the select door 400 may be opened and closed to control whether the air passed through the cooler core 160 flows into or is blocked from flowing into the heater core 180, and thereby adjusting temperature of air discharged into the indoor space of the vehicle. In addition, as illustrated in FIG. 1, in the air conditioner, the air outlet 140 of the indoor air conditioner 100 may include a vent outlet 142 and a floor outlet 144; and the air conditioner according to the present disclosure may further include a first outlet door 500 that adjusts the air flowing into the air outlet 140 to pass through at least one of the vent outlet 142 and the floor outlet 144.

Figure 7:
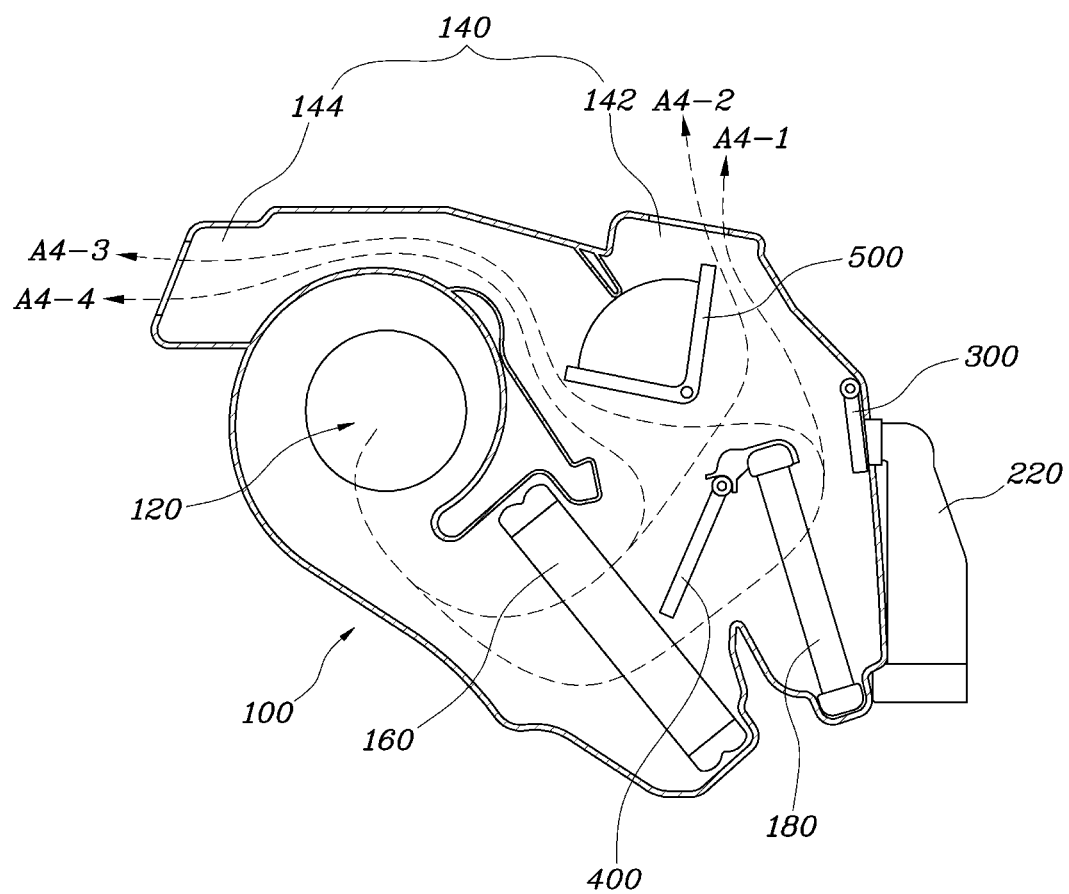

The vent outlet 142 and the floor outlet 144 may be connected to the indoor space of the vehicle. In particular, the floor outlet 144 may be connected to a floor surface of the indoor space of the vehicle to discharge the air below a passenger seat, and the vent outlet 142 may discharge the air into an upper or center space of the indoor space of the vehicle. As illustrated in FIG. 1, the first outlet door 500 may be configured to close an air flow path toward the vent outlet 142 of the air outlet 140 and open an air flow path toward the floor outlet 144. As illustrated in FIG. 4, the first outlet door 500 may be configured to close the air flow path toward the floor outlet 144 of the air outlet 140 and open the air flow path toward the vent outlet 142. As illustrated in FIG. 7, the first discharge door 500 may be configured to simultaneously open the air flow path toward the vent outlet 142 of the air outlet 140 and the air flow path toward the floor outlet 144 of the air outlet 140.

As illustrated in FIG. 14, the air conditioner according to another exemplary embodiment of the present disclosure may further include a controller 600 configured to operate the dryer door 300, the select door 400 and the first outlet door 500 to adjust the temperature and humidity of the indoor space of the vehicle and the dryer 200. The controller according to an exemplary embodiment of the present disclosure may be realized by an algorithm configured to execute operations of various components of the vehicle, a nonvolatile memory (not illustrated) configured to store data related to software instructions reproducing the algorithm, and a processor (not illustrated) configured to perform operations described below using the data stored in the memory.

Particularly, the memory and the processor may be realized as separate chips. Alternatively, the memory and the processor may be realized as a single chip integrated with each other. The processor may include one or more processor chips. The controller 600 may be connected to control each of the dryer door 300, the select door 400 and the first outlet door 500, to adjust whether the air discharged from the indoor air conditioner 100 flows into the indoor space of the vehicle and the dryer 200. The controller 600 may be configured to combine mode setting information stored in advance to each other to operate the dryer door 300, the select door 400, and the first outlet door 500 by a manual setting or an automatic control.

FIGS. 4 to 8 are views illustrating each mode of an air conditioner according to an exemplary embodiment of the present disclosure. FIGS. 4 to 8 illustrate only the inlet port 220 of the dryer 200 and omit the drying space T. In particular, as illustrated in FIG. 4, in a first mode in which air does not flow into the indoor space of the vehicle and dehumidified and heated air flows into the dryer 200, the controller 600 may be configured to operate the select door 400 not to allow the air to flow into the air outlet 140 of the indoor air conditioner 100 and the dryer door 300 to allow the air to flow into the inlet port 220 of the dryer 200. In other words, the controller 600 may be configured to close the select door 400 to prevent air from flowing into the air outlet 140 and open the dryer door 300 to allow the air to flow into the inlet port 220.

In the first mode as illustrated in FIG. 4, the indoor air conditioner 100 does not discharge the air into the indoor space of the vehicle and discharges the dehumidified and heated air only into the dryer 200. The select door 400 may be configured to close an air flow path directly connected from the cooler core 160 to the air outlet 140 and the dryer door 300 may be configured to close an air flow path connected from the heater core 180 to the air outlet 140. Accordingly, in the first mode, the air in the indoor space of the vehicle is not controlled, and only the dryer 200 is used. Along path "A1" in FIG. 4, the outside or inside air of the vehicle flows into the indoor air conditioner 100 through the air inlet 120, dehumidified and heated passing through the cooler core 160 and the heater core 180, and then discharged into the dryer 200 through the inlet port 220 of the dryer 200.

Figure 5:
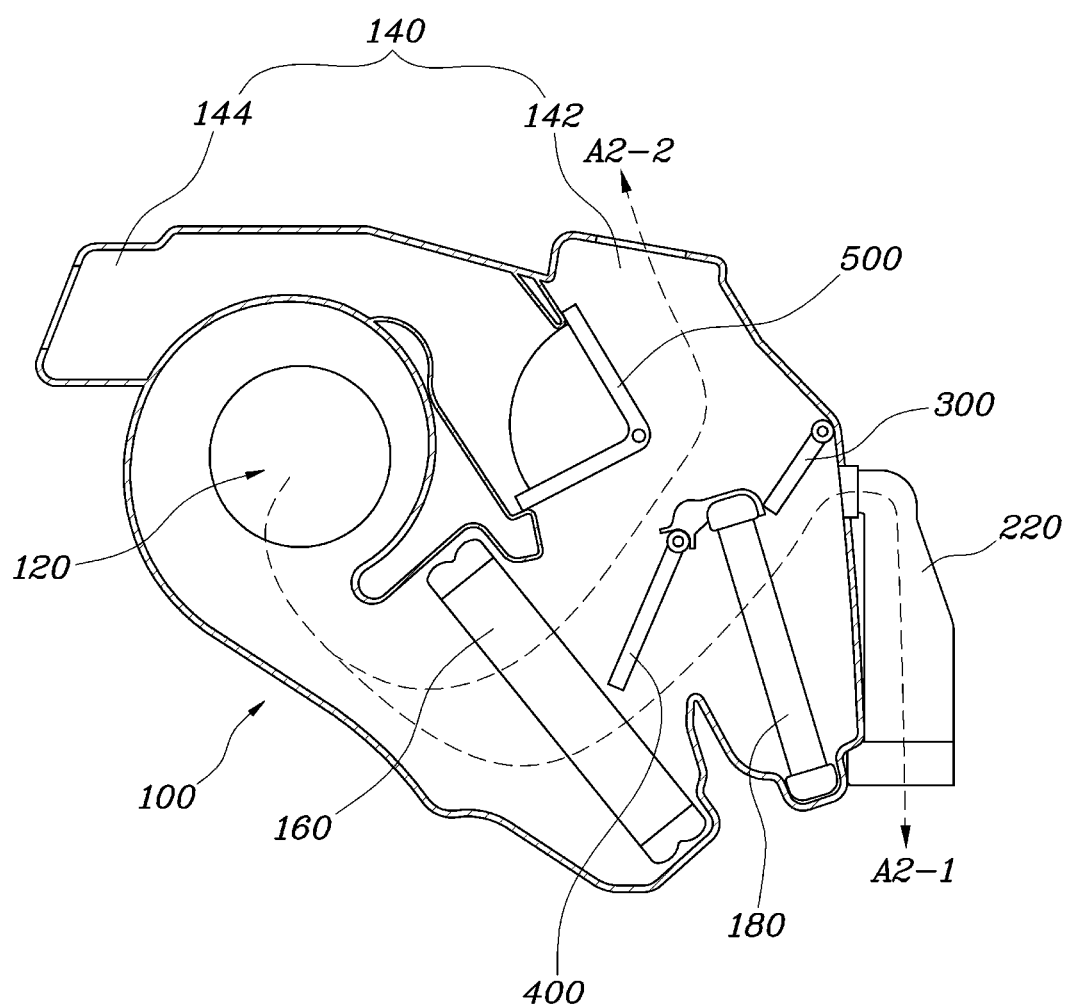

As illustrated in FIG. 5, in a second mode in which cooled air flows into the indoor space of the vehicle and dehumidified and heated air flows into the dryer 200, the controller 600 may be configured to operate the select door 400 to allow the air to flow into the air outlet 140 of the indoor air conditioner 100 and the heater core 180 and the dryer door 300 to allow the air to flow into the inlet port 220 of the dryer 200. In other words, the controller 600 may be configured to open the select door 400 and the dryer door 300.

In the second mode as illustrated in FIG. 5, the indoor air conditioner 100 discharges the cooled air into the indoor space of the vehicle and discharges the dehumidified and heated air into the dryer 200. The select door 400 may be configured to open both the air flow path directly connected from the cooler core 160 to the air outlet 140 and the air flow path directly connected from the cooler core 160 to the heater core 180. The dryer door 300 may be configured to close the air flow path directly connected from the heater core 180 to the air outlet 140 and open an air flow path connected from the heater core 180 to the inlet port 220 of the dryer 200. Accordingly, in the second mode, the air in the indoor space of the vehicle and the air in the dryer 200 may be adjusted at the same time.

Along path "A2-1" in FIG. 5, the outside or inside air of the vehicle may flow into the indoor air conditioner 100 through the air inlet 120, dehumidified and heated passing through the cooler core and the heater core, and may then be discharged into the dryer 200 through the inlet port 220 of the dryer 200. Along path "A2-2" in FIG. 5, the outside or inside air of the vehicle may be cooled passing through the cooler core 160 and then may be discharged into the air outlet 140. FIG. 5 illustrates the first outlet door 500 closing the floor outlet 144 and opening the vent outlet 142, to discharge the cooled air into the vent outlet 142; however, the cooled air may either be discharged into the floor outlet 144 based on a control of the first outlet door 500.

Figure 6:
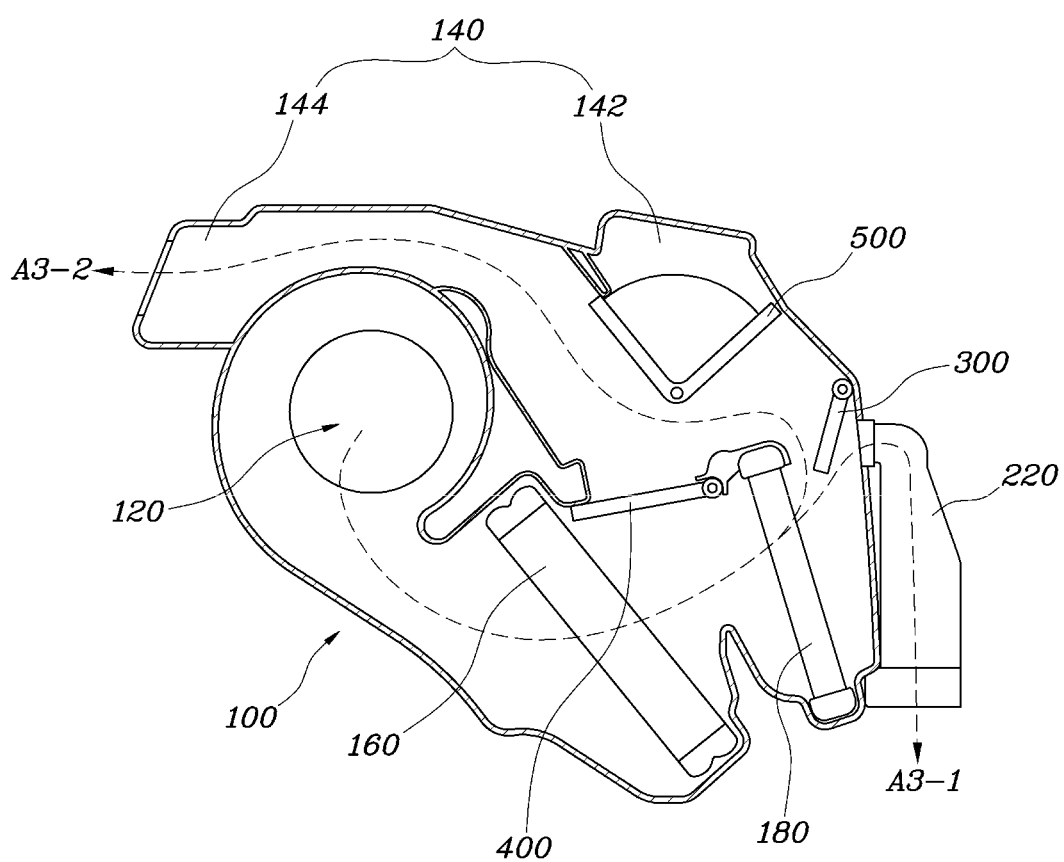

As illustrated in FIG. 6, in a third mode in which the dehumidified and heated air may flow into the indoor space of the vehicle and the dryer 200, the controller 600 may be configured to operate the select door 400 not to allow the air to flow into the air outlet 140 of the indoor air conditioner 100 and the dryer door 300 to allow the air to flow into the inlet port 220 of the dryer and the air outlet 140 of the indoor air conditioner 100. In other words, the controller 600 may be configured to close the select door 400 and open the dryer door 300.

In the third mode as illustrated in FIG. 6, the indoor air conditioner 100 discharges the dehumidified and heated air into the indoor space of the vehicle and the dryer. The select door 400 may be configured to close the air flow path directly connected from the cooler core 160 to the air outlet 140 and the dryer door 300 may be configured to open both the air flow path connected from the heater core 180 to the inlet port 220 of the dryer 200 and the air flow path directly connected from the heater core 180 to the air outlet 140. Accordingly, in the third mode, the air in the indoor space of the vehicle and the air in the dryer 200 may be adjusted at the same time.

Along path "A3-1" in FIG. 6, the outside or inside air of the vehicle may be dehumidified and heated passing through the cooler core 160 and the heater core 180 and then may be discharged into the dryer 200 through the inlet port 220 of the dryer 200; and the air passed through the heater core 180 may be divided and discharged into the indoor space of the vehicle along path "A3-2." As a result, the dehumidified and heated air may also be discharged into the indoor space of the vehicle. FIG. 6 illustrates the first outlet door 500 closing the vent outlet 142 and opening the floor outlet 144, to discharge the dehumidified and heated air into the floor outlet 144; however, the dehumidified and heated air may either be discharged into the vent outlet 142 based on a control of the first outlet door 500.

In addition, as illustrated in FIG. 7, in a fourth mode in which the air does not flow into the dryer 200, the controller 600 may be configured to operate the dryer door 300 not to allow the air to flow into the inlet port 220 of the dryer 200. In other words, the controller 600 may be configured to close the dryer door 300. In the fourth mode as illustrated in FIG. 7, the indoor air conditioner 100 discharges the air only into the indoor space of the vehicle and does not discharge the air into the dryer 200. The dryer door 300 may be configured to close the inlet port 220 of the dryer 200 to prevent the air passed through the heater core 180 from passing through the inlet port 220 of the dryer 200. Accordingly, in the fourth mode, the dryer 200 is not used and the air is discharged only into the indoor space of the vehicle.

Path "A4-1" in FIG. 7 illustrates a state in which the dehumidified and heated air may be discharged into the vent outlet 142; path "A4-2" illustrates a state in which the cooled air may be discharged into the vent outlet 142; path "A4-3" illustrates a state in which the dehumidified and heated air may be discharged into the floor outlet 144; and path "A4-4" illustrates a state in which the cooled air may be discharged into the floor outlet 144. The four paths illustrated in FIG. 7 are merely illustrative, and the cooled air or the dehumidified and heated air may be discharged into the indoor space of the vehicle in various ways based on controls of the select door 400 and the first outlet door 500.

Figure 8:
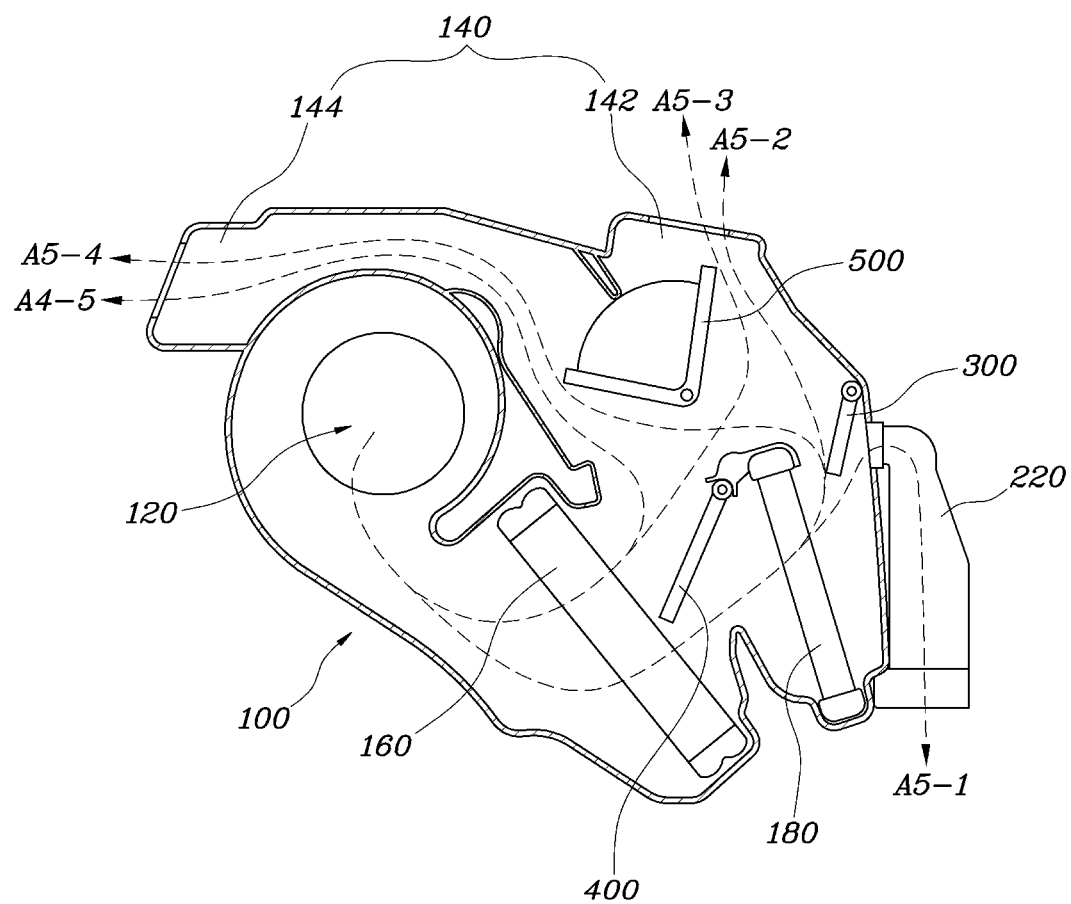

Further, as illustrated in FIG. 8, in a fifth mode in which warm air flows into the indoor space of the vehicle and the dehumidified and heated air flows into the dryer, the controller 600 may be configured to operate the select door 400 to allow the air to flow into the air outlet 140 and the heater core 180 and the dryer door 300 to allow the air passed through the heater core 180 to flow into the air outlet 140 and the inlet port 220 of the dryer 200. In other words, the controller 600 may be configured to open the select door 400 and the dryer door 300. In the fifth mode as illustrated in FIG. 8, the air in the dryer 200 and the air in the indoor space of the vehicle may be adjusted at the same time. In particular, the dehumidified and heated air may flow into the dryer 200, and the warm air may flow into the interior space of the vehicle due to a simultaneous discharge of the cooled air and the heated air.

Path "A5-1" in FIG. 8 illustrates a state in which the dehumidified and heated air may be discharged into the dryer 200; path "A5-2" illustrates a state in which the dehumidified and heated air may be discharged into the vent outlet 142; path "A5-3" illustrates a state in which the cooled air is discharged into the vent outlet 142; path "A5-4" illustrates a state in which the dehumidified and heated air may be discharged into the floor outlet 144; and path "A5-5" illustrates a state in which the cooled air may be discharged into the floor outlet 144.

Figure 9:
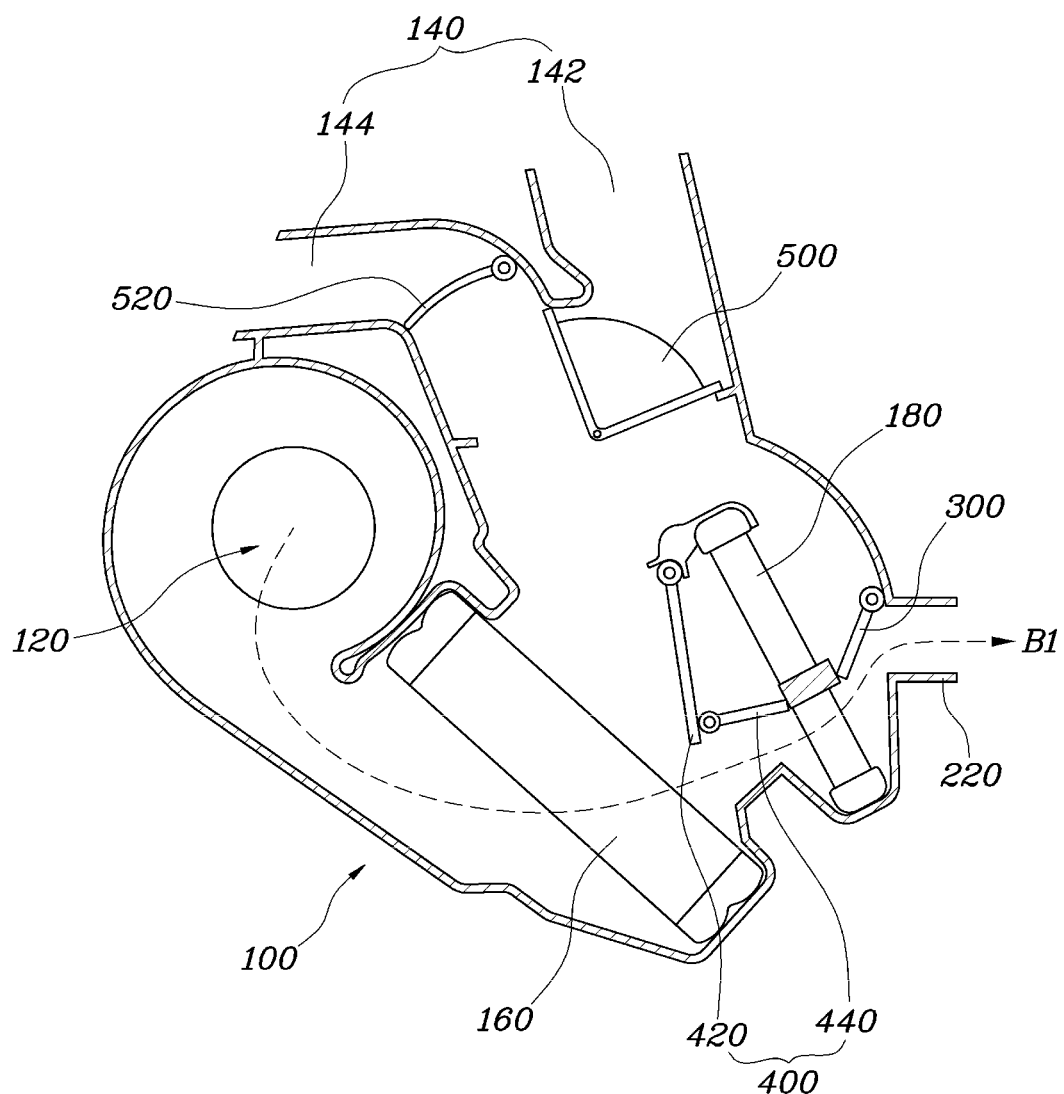
FIGS. 9 to 13 are views illustrating each mode of an air conditioner for a vehicle according to another exemplary embodiment of the present disclosure.
Figure 10:
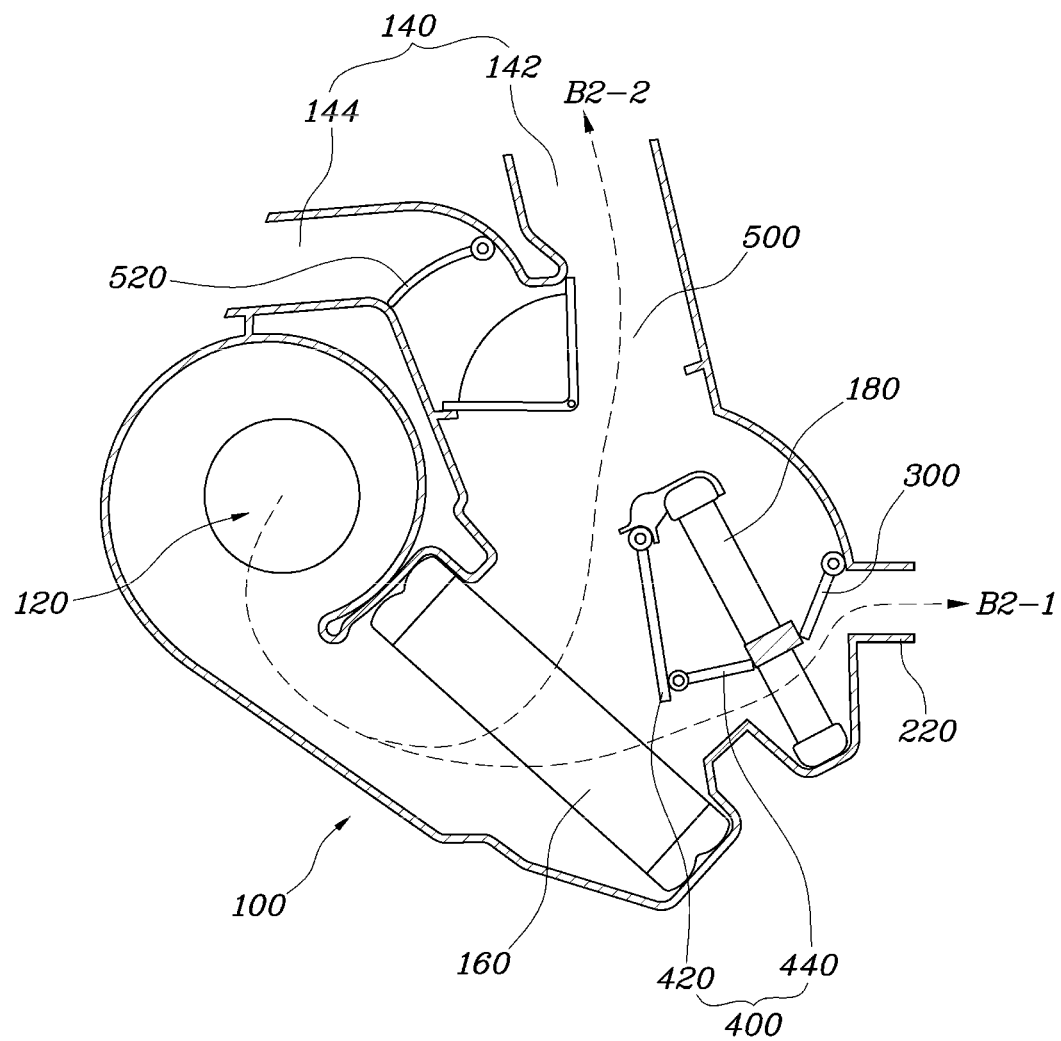
Figure 11:
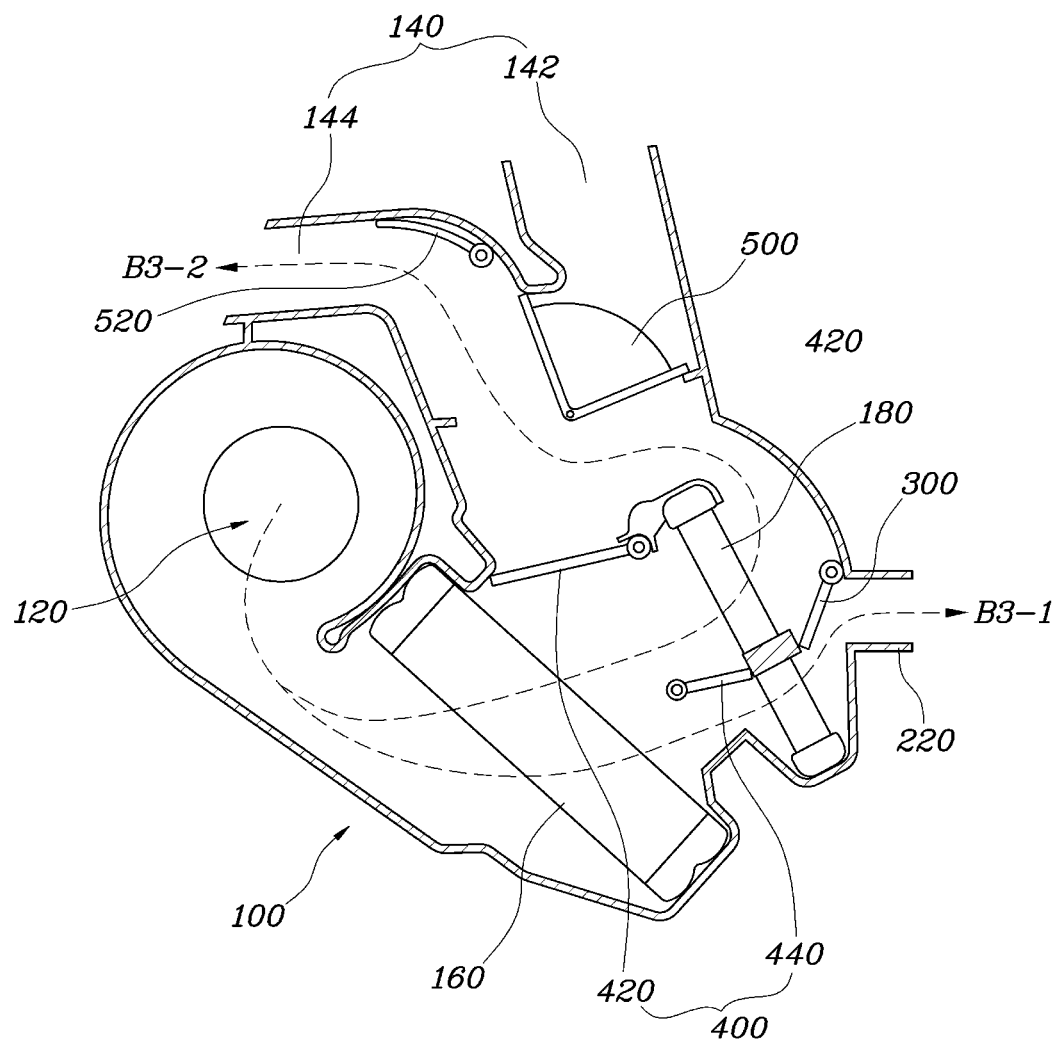

Meanwhile, as illustrated in FIGS. 9 to 13, in the air conditioner according to another exemplary embodiment of the present disclosure, the select door 400 may include a first select door 420 and a second select door 440. The first select door 420 may be configured to control whether the air passed through the cooler core 160 flows to directly into the air outlet 140. FIG. 10 illustrates a state in which the air passed through the cooler core 160 directly flows into the air outlet 140, and FIG. 11 illustrates a state in which the air passed through the cooler core 160 does not directly flow into the air outlet 140.

In addition, as illustrated in FIGS. 9 to 13, the air conditioner according to another exemplary embodiment of the present disclosure may further include a second outlet door 520 disposed at any one of the vent outlet 142 and the floor outlet 144 of the air outlet 140. The second outlet door 520 may be configured to adjust the air flowing into the air outlet 140 to pass through both, one, or none of the vent outlet 142 and the floor outlet 144. FIGS. 9 to 13 illustrate that the second outlet door 520 may be formed in the floor outlet 144, but the second outlet door 520 may either be formed in the vent outlet 142 depending on a design change. When the second outlet door 520 is formed in the floor outlet port 144 as illustrated in the drawings, the second outlet door 520 may be configured to open and close the floor outlet 144 of the air outlet 140.

Meanwhile, as illustrated in FIG. 14, an air conditioner according to another exemplary embodiment of the present disclosure may further include a controller 600 configured to operate the dryer door 300, the first select door 420, the second select door 440, the first outlet door 500, and the second outlet door 520 to adjust the temperature and humidity of the indoor space of the vehicle and the dryer 200. The controller 600 may be connected to operate each of the dryer door 300, the first select door 420, the second select door 440, the first outlet door 500, and the second outlet door, thereby controlling the air discharged from the indoor air conditioner 100 into the indoor space of the vehicle and the dryer 200. In particular, the controller 600 may be configured to combine mode setting information stored in advance to each other to operate the dryer door 300, the first select door 420, the second select door, the first outlet door 500 and the second outlet door 520 by a manual setting or an automatic control.

FIGS. 9 to 13 are views illustrating each mode of the air conditioner according to another exemplary embodiment of the present disclosure. FIGS. 9 to 13 illustrate only the inlet port 220 of the dryer 200 and omit the drying space T. In particular, as illustrated in FIG. 9, in the first mode in which the air does not flow into the indoor space of the vehicle and the dehumidified and heated air flows into the dryer 200, the controller 600 may be configured to operate the dryer door 300 to allow the air to flow into the inlet port 220 of the dryer 200 and the first and second outlet doors 500 and 520 not to allow the air to flow into the vent outlet 142 or the floor outlet 144. In other words, the controller 600 may be configured to open the dryer door 300 and close the first and second outlet doors 500.

In the first mode as illustrated in FIG. 9, the indoor air conditioner 100 does not discharge the air into the indoor space of the vehicle and discharges the dehumidified and heated air only into the dryer 200. The dryer door 300 may be configured to open the inlet port 220 of the dryer 200 and allow the dehumidified and heated air passed through the heater core 180 to flow into the dryer 200. Meanwhile, the first outlet door 500 may be configured to close the vent outlet 142 and the second outlet door 520 may be configured to close the floor outlet 144, to prevent the indoor air conditioner 100 from flowing into the indoor space of the vehicle. Accordingly, in the first mode, the air in the indoor space of the vehicle is not controlled, and only the dryer 200 is used. Along path "B1" in FIG. 9, the outside or inside air of the vehicle may flow into the indoor air conditioner 100 through the air inlet 120, dehumidified and heated passing through the cooler core 160 and the heater core 180, and then may be discharged into the dryer 200 through the inlet port 220 of the dryer 200.

In addition, as illustrated in FIG. 10, in the second mode in which the cooled air flows into the indoor space of the vehicle and the dehumidified and heated air flows into the dryer 200, the controller 600 may be configured to operate the first select door 420 and the second select door 440 to allow the air to flow into the air outlet 140 of the indoor air conditioner 100 and the heater core 180 and the dryer door 300 to allow the air to flow into the inlet port 220 of the dryer 200. In other words, the controller 600 may be configured to open the first select door 420, the second select door 440, and the dryer door 300.

In the second mode as illustrated in FIG. 10, the indoor air conditioner 100 discharges the cooled air into the indoor space of the vehicle and discharges the dehumidified and heated air into the dryer 200. The first select door 420 may be configured to open the air flow path directly connected from the cooler core 160 to the air outlet 140 and the second select door 440 may be configured to open the air flow path directly connected from the cooler core 160 to the heater core 180. The dryer door 300 may be configured to close the air flow path directly connected from the heater core 180 to the air outlet 140 and open the air flow path connected from the heater core 180 to the inlet port 220 of the dryer 200. Accordingly, in the second mode, the air in the indoor space of the vehicle and the air in the dryer 200 may be adjusted at the same time.

Along path "B2-1" in FIG. 10, the outside or inside air of the vehicle may flow into the indoor air conditioner 100 through the air inlet 120, dehumidified and heated passing through the cooler core and the heater core, and then may be discharged into the dryer 200 through the inlet port 220 of the dryer 200. Along path "B2-2" in FIG. 10, the outside or inside air of the vehicle may be cooled passing through the cooler core 160 and then may be discharged into the air outlet 140. FIG. 10 illustrates the first outlet door 500 closing the floor outlet 144 and opening the vent outlet 142, to discharge the cooled air into the vent outlet 142; however, the cooled air may either be discharged into the floor outlet 144 depending on a control of the first outlet door 500.

In addition, as illustrated in FIG. 11, in the third mode in which the dehumidified and heated air flows into the indoor space of the vehicle and the dryer, the controller 600 may be configured to operate the first select door 420 not to allow the air to flow into the air outlet 140 of the indoor air conditioner 100 and the dryer door 300 to allow the air to flow into the inlet port 220 of the dryer 200. In other words, the controller 600 may be configured to close the first select door 420 and open the dryer door 300.

In the third mode as illustrated in FIG. 11, the indoor air conditioner 100 discharges the dehumidified and heated air into the indoor space of the vehicle and the dryer. The first select door 420 may be configured to close the air flow path directly connected from the cooler core 160 to the air outlet 140 and open the air flow path directly connected from the cooler core 160 to the heater core 180. The second select door 440 may be configured to open the air flow path directly connected from the cooler core 160 to the heater core 180. The dryer door 300 may be configured to open the air flow path connected from the heater core 180 to the inlet port 220 of the dryer 200. Accordingly, in the third mode, the air in the indoor space of the vehicle and the air in the dryer 200 may be adjusted at the same time.

Along path "B3-1" in FIG. 11, the outside or inside air of the vehicle may be dehumidified and heated passing through the cooler core 160 and the heater core 180 and then may be discharged into the dryer 200 through the inlet port 220 of the dryer 200; and the air divided after passing through the cooler core 160 and then passed through the heater core 180 may be discharged into the indoor space of the vehicle along path "B3-2." As a result, the dehumidified and heated air may also be discharged into the indoor space of the vehicle. FIG. 11 illustrates the first outlet door 500 closing the air flow path toward the vent outlet 142 and the second outlet door 520 opening the air flow path toward the floor outlet 144, to discharge the dehumidified and heated air into the floor outlet 144; however, the dehumidified and heated air may either be discharged into the vent outlet 142 depending on controls of the first outlet door 500 and the second outlet door 520.

Figure 12:
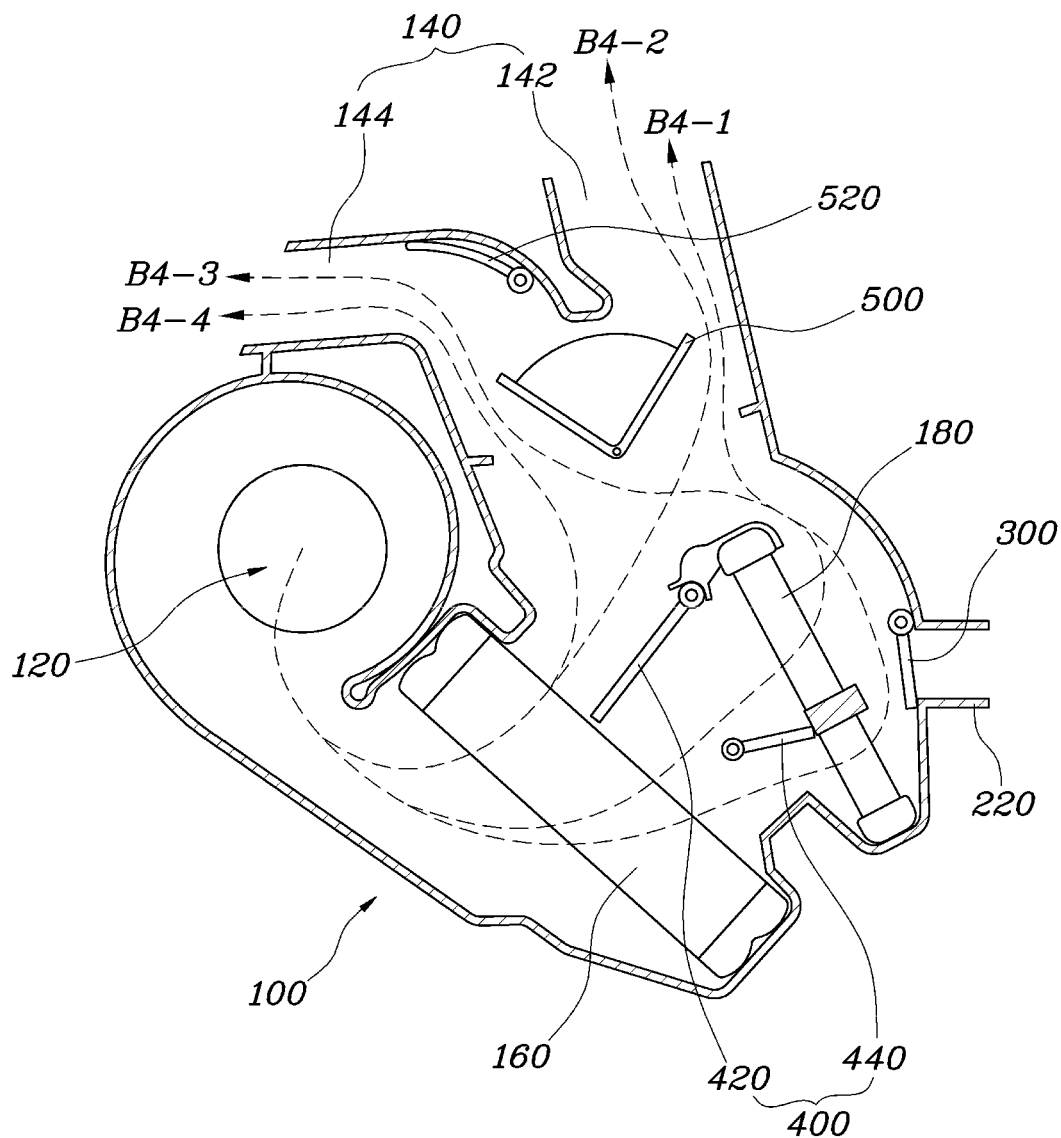

In addition, as illustrated in FIG. 12, in the fourth mode in which the air does not flow into the dryer 200, the controller 600 may be configured to operate the dryer door 300 not to allow the air to flow into the inlet port 220 of the dryer 200. In other words, the controller 600 may be configured to close the dryer door 300. In the fourth mode as illustrated in FIG. 12, the indoor air conditioner 100 discharges the air only into the indoor space of the vehicle and does not discharge the air into the dryer 200. The dryer door 300 may be configured to close the inlet port 220 of the dryer 200 to prevent the air passed through the heater core 180 from passing through the inlet port 220 of the dryer 200. Accordingly, in the fourth mode, the dryer 200 is not used and the air is discharged only into the indoor space of the vehicle.

Path "B4-1" in FIG. 12 illustrates a state in which the dehumidified and heated air may be discharged into the vent outlet 142; path "B4-2" illustrates a state in which the cooled air may be discharged into the vent outlet 142; path "B4-3" illustrates a state in which the dehumidified and heated air may be discharged into the floor outlet 144; and path "B 4-4" illustrates a state in which the cooled air may be discharged into the floor outlet 144. The four paths illustrated in FIG. 12 are merely illustrative, and the cooled air or the dehumidified and heated air may be discharged into the indoor space of the vehicle in various ways depending on controls of the first select door 420, the second select door, the first outlet door 500, and the second outlet door.

Figure 13:
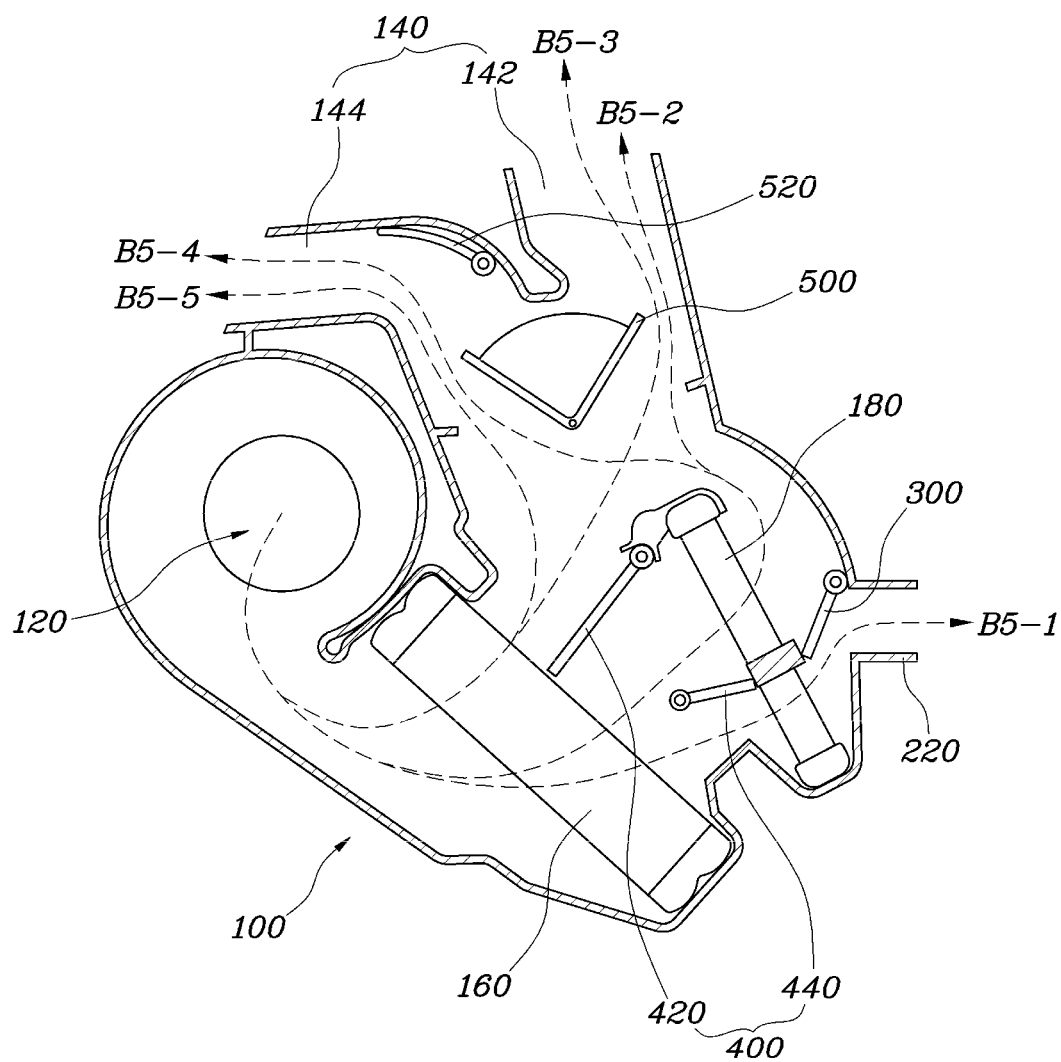

Further, as illustrated in FIG. 13, in the fifth mode in which the warm air flows into the indoor space of the vehicle and the dehumidified and heated air flows into the dryer 200, the controller 600 may be configured to operate the first and second select doors 420 and 440 to allow the air to flow into the air outlet 140 and the heater core 180 and the dryer door 300 to allow the air passed through the heater core 180 to flow into the air outlet 140 and the inlet port 220 of the dryer 200. In other words, the controller 600 may be configured to open the first and second select doors 420, 400 and the dryer door 300.

Path "B5-1" in FIG. 13 illustrates a state in which the dehumidified and heated air may be discharged into the dryer 200; path "B5-2" illustrates a state in which the dehumidified and heated air may be discharged into the vent outlet 142; path "B5-3" illustrates a state in which the cooled air may be discharged into the vent outlet 142; path "B5-4" illustrates a state in which the dehumidified and heated air may be discharged into the floor outlet 144; and path "B5-5" illustrates a state in which the cooled air may be discharged into the floor outlet 144.

In addition, the air conditioner according to the present disclosure may further include a deodorizer 260 disposed at one side of the dryer 200 and the air passed through the deodorizer 260 deodorizes the dry subject. A cluster ionizer or a photocatalyst may be used for the deodorizer 260, and sterilize and deodorize the dry subject. In addition, as illustrated in FIG. 15, the air conditioner according to the present disclosure may further include a distribution panel 290 formed in a panel shape on the drying space T of the dryer 200 and having a plurality of air flow apertures therein to allow the air flowed into the dryer 200 to be sprayed into the drying space T.

For understanding, FIG. 15 illustrates a state in which the lid 280 of the dryer 200 is removed. As illustrated in FIG. 15, the distribution panel 290 may be disposed in the dryer 200 of the present disclosure, and a plurality of flow apertures may be formed in the distribution panel 290. Accordingly, the air flowing into the dryer 290 may be distributed on the distribution panel 290 and may be sprayed into the drying space T through the plurality of the air flow apertures. The plurality of air flow apertures may be spaced apart from one another on the distribution panel 290 to uniformly spray the air into the drying space T.

In addition, as illustrated in FIG. 16, the air conditioner according to the present disclosure may further include a distribution duct 295 formed in a duct shape in an upper portion of the king space T of the dryer 200 and having a first side connected to the inlet port 220 of the dryer 200 and a second side formed with a distribution aperture 296 disposed diagonally to the outlet port of the dryer. For understanding FIG. 16 illustrates a state in which the lid 280 of the dryer 200 is removed.

As illustrated in FIG. 16, the distribution duct 295 may be disposed in the dryer 200 of the present disclosure, and one side of the distribution duct 295 may be connected to the inlet port 220 of the dryer 200. In addition, the distribution aperture 296 of the distribution duct 295 may be disposed diagonally to the outlet port 240 of the dryer 200. Therefore, the air flowing into the drying space T through the distribution aperture 296 may be discharged into the outlet port 240 of the dryer 200. Since the distribution aperture 296 and the outlet port 240 may be disposed diagonally to each other, the air may be uniformly distributed in the drying space T.

According to the air conditioner of the present disclosure, it may be possible to adjust the temperature and humidity of the indoor space of the vehicle and simultaneously to dry the dry subject such as clothes and the like. In particular, the dry subject may be dried while the vehicle is being driven thus improving passenger comfort.

Although the present disclosure is shown and described with respect to specific exemplary embodiments, it is apparent to those having ordinary skill in the art that the present disclosure may be variously modified and altered without departing from the spirit and scope of the present disclosure as defined by the following claims.

What is claimed is:

1. An air conditioner for a vehicle, comprising:
   an indoor air conditioner having an air inlet through which air flows into the indoor air conditioner, a cooler core, a heater core disposed at a point downstream of the cooler core, and an air outlet through which the air is discharged into an indoor space of the vehicle;
   a dryer having a drying space in which a dry subject is stored, an inlet port connected to a point downstream of the heater core of the indoor air conditioner to allow air passed through the heater core to flow into the drying space, and an outlet port connected to the drying space to discharge air passed through the drying space to outside; and
   a dryer door disposed between the indoor air conditioner and the inlet port of the dryer and controlling whether the air passed through the heater core flows into the dryer.

2. The air conditioner of claim 1, wherein a cross-sectional area of the inlet port of the dryer into which the air flows is wider than a cross-sectional area of the outlet port of the dryer.

3. The air conditioner of claim 1, further comprising:
   a select door disposed between the cooler core and the heater core of the indoor air conditioner and controlling whether the air passed through the cooler core flows into the heater core.

4. The air conditioner of claim 3, wherein the air outlet of the indoor air conditioner includes a vent outlet and a floor outlet, and the air conditioner further includes a first outlet door that adjusts the air flowing into the air outlet to pass through at least one of the vent outlet and the floor outlet.

5. The air conditioner of claim 4, further comprising:
   a controller configured to operate the dryer door, the select door and the first outlet door to adjust temperature and humidity of the indoor space of the vehicle and the dryer.

6. The air conditioner of claim 5, wherein in a first mode in which air does not flow into the indoor space of the vehicle and dehumidified and heated air flows into the dryer, the controller is configured to operate the select door to block the air from flowing into the air outlet of the indoor air conditioner and operate the dryer door to allow the air to flow into the inlet port of the dryer.

7. The air conditioner of claim 5, wherein in a second mode in which cooled air flows into the indoor space of the vehicle and dehumidified and heated air flows into the dryer, the controller is configured to operate the select door to allow the air to flow into the air outlet of the indoor air conditioner and the heater core and operate the dryer door to allow the air to flow into the inlet port of the dryer.

8. The air conditioner of claim 5, wherein in a third mode in which the dehumidified and heated air flows into the indoor space of the vehicle and the dryer, the controller is configured to operate the select door to block the air from flowing into the air outlet of the indoor air conditioner and operate the dryer door to allow the air to flow into the inlet port of the dryer and the air outlet of the indoor air conditioner.

9. The air conditioner of claim 5, wherein in a fourth mode in which the air does not flow into the dryer, the controller is configured to operate the dryer door to block the air from flowing into the inlet port of the dryer.

10. The air conditioner of claim 4, wherein the select door includes:
   a first select door and a second select door,
   wherein the first select door controls whether the air passed through the cooler core flows directly into the air outlet and the second select door controls whether the air passed through the cooler core flows into the heater core together with the first select door,
   wherein the air conditioner further includes a second outlet door disposed at any one of the vent outlet and the floor outlet of the air outlet, and
   wherein the second outlet door adjusts the air flowing into the air outlet to pass through both, one, or none of the vent outlet and the floor outlet.

11. The air conditioner of claim 10, further comprising:
   a controller configured to operate the dryer door, the first select door, the second select door, the first outlet door, and the second outlet door to adjust the temperature and humidity of the indoor space of the vehicle and the dryer.

12. The air conditioner of claim 11, wherein in the first mode in which the air does not flow into the indoor space of the vehicle and the dehumidified and heated air flows into the dryer, the controller is configured to operate the dryer door to allow the air to flow into the inlet port of the dryer and operate the first and second outlet doors to block the air from flowing into the vent outlet and the floor outlet.

13. The air conditioner of claim 11, wherein in the second mode in which the cooled air flows into the indoor space of the vehicle and the dehumidified and heated air flows into the dryer, the controller is configured to operate the first select door and the second select door to allow the air to flow into the air outlet of the indoor air conditioner and the heater core and operate the dryer door to allow the air to flow into the inlet port of the dryer.

14. The air conditioner of claim 11, wherein in the third mode in which the dehumidified and heated air flows into the indoor space of the vehicle and the dryer, the controller is configured to operate the first select door to block the air from flowing into the air outlet of the indoor air conditioner and operate the dryer door to allow the air to flow into the inlet port of the dryer.

15. The air conditioner of claim 11, wherein in the fourth mode in which the air does not flow into the dryer, the controller is configured to operate the dryer door to block the air from flowing into the inlet port of the dryer.

16. The air conditioner of claim 1, further comprising:
   a deodorizer disposed at one side of the dryer,
   wherein the air passed through the deodorizer deodorizes the dry subject.

17. The air conditioner of claim 1, further comprising:
   a distribution panel formed in a panel shape on the drying space of the dryer and having a plurality of air flow apertures therein to allow the air flowed into the dryer to be sprayed into the drying space.

18. The air conditioner of claim 1, further comprising:
   a distribution duct formed in a duct shape in an upper portion of the drying space of the dryer and having a first side connected to the inlet port of the dryer and a second side formed with a distribution aperture disposed diagonally to the outlet port of the dryer to spray the air into the drying space uniformly.

* * * * *